US012165598B2

(12) United States Patent
Yang et al.

(10) Patent No.: US 12,165,598 B2
(45) Date of Patent: *Dec. 10, 2024

(54) PIXEL AND DISPLAY DEVICE INCLUDING THE SAME

(71) Applicant: SAMSUNG DISPLAY CO., LTD., Yongin-si (KR)

(72) Inventors: Jin Wook Yang, Yongin-si (KR); Gun Hee Kim, Yongin-si (KR); Sun Young Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,628

(22) Filed: Jun. 28, 2023

(65) Prior Publication Data

US 2023/0343295 A1 Oct. 26, 2023

Related U.S. Application Data

(63) Continuation of application No. 17/868,153, filed on Jul. 19, 2022, now Pat. No. 11,862,101.

(30) Foreign Application Priority Data

Sep. 30, 2021 (KR) ........................ 10-2021-0130175

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2300/0842* (2013.01);
(Continued)

(58) Field of Classification Search
None
See application file for complete search history.

(56) References Cited

U.S. PATENT DOCUMENTS 10,964,264 B1 3/2021 Kim ..................... G09G 3/3233
2017/0345367 A1* 11/2017 Ka ..................... H10K 59/1213
(Continued)

FOREIGN PATENT DOCUMENTS

KR 1020100072433 A 7/2010
KR 1020210050050 A 5/2021

*Primary Examiner* — Nitin Patel
*Assistant Examiner* — Amen W Bogale
(74) *Attorney, Agent, or Firm* — CANTOR COLBURN LLP

(57) ABSTRACT

A display device includes: a pixel, a scan driver, an emission driver, and a data driver. The pixel includes: a light emitting element; a first transistor; a second transistor connected between a data line and a first node; a third transistor connected between a second node and a third node connected to a gate electrode of the first transistor; a fourth transistor connected between the second node and a third power line; a fifth transistor connected between the first node and a fourth node; a sixth transistor connected between a first power line and the first node and which is turned off in response to a first emission control signal; a storage capacitor connected between the third node and the fourth node; and a first capacitor connected between the first power line and the fourth node.

10 Claims, 12 Drawing Sheets

(52) U.S. Cl.
CPC ............... *G09G 2310/0278* (2013.01); *G09G 2330/021* (2013.01)

(56) References Cited

U.S. PATENT DOCUMENTS

| | | | | |
|---|---|---|---|---|
| 2019/0287452 | A1* | 9/2019 | Wang | G09G 3/325 |
| 2021/0125543 | A1 | 4/2021 | Kim et al. | |
| 2021/0193055 | A1* | 6/2021 | Lee | G09G 3/3291 |
| 2021/0201759 | A1 | 7/2021 | Cho | G09G 3/3233 |
| 2021/0201764 | A1 | 7/2021 | Oh et al. | |
| 2021/0201782 | A1 | 7/2021 | Jang | G09G 3/3233 |
| 2021/0201827 | A1 | 7/2021 | Jang | G09G 3/3291 |
| 2021/0256908 | A1 | 8/2021 | Park et al. | |
| 2021/0383752 | A1 | 12/2021 | Yang | G09G 3/3233 |
| 2022/0051633 | A1* | 2/2022 | Li | G09G 3/3266 |
| 2022/0173189 | A1* | 6/2022 | Kim | H10K 59/1213 |
| 2023/0008643 | A1 | 1/2023 | Park | G09G 3/3233 |
| 2023/0024280 | A1 | 1/2023 | Yanase | G09G 3/325 |
| 2023/0069447 | A1 | 3/2023 | Kang | G09G 3/32 |

* cited by examiner

DP1

DP2

DP1

PIXEL AND DISPLAY DEVICE INCLUDING THE SAME

This application is a continuation of U.S. patent application Ser. No. 17/868,153, filed on Jul. 19, 2022, which claims priority to Korean Patent Application No. 10-2021-0130175, filed on Sep. 30, 2021, and all the benefits accruing therefrom under 35 U.S.C. § 119, the content of which in its entirety is herein incorporated by reference.

BACKGROUND

1. Field

The present invention relates to a display device, and more particularly, to a pixel and a display device including the same.

2. Description of the Related Art

A display device includes a plurality of pixels. Each of the pixels includes a plurality of transistors, a light emitting element electrically connected to the transistors, and a capacitor. The transistors generate a driving current based on signals provided through signal lines, and the light emitting element emits light based on the driving current.

A display device with low power consumption is desirable to improve driving efficiency according to driving conditions of the display device. For example, power consumption of the display device may be reduced by lowering a frame frequency (or a driving frequency) at the time of displaying a still image. In addition, in order to implement a high-resolution, stereoscopic image, or the like, the display device may display an image at a high frame frequency of 120 Hertz (Hz) or more.

In other words, to display images under various conditions, the display device may display images at various frame frequencies (or driving frequencies).

SUMMARY

Embodiments provide a pixel that secures a compensation period based on a current path formed by a fifth transistor and on/off of a sixth transistor.

Embodiments provide a display device including the pixel.

However, the aspects of the present invention are not limited to the above-described aspects, and may be variously expanded without departing from the spirit and scope of the present invention.

According to embodiments, a display device includes: a pixel connected to first to fifth scan lines, first and second emission control lines, and a data line; a scan driver which supplies first to fifth scan signals to the first to fifth scan lines, respectively; an emission driver which supplies first and second emission control signals to the first and second emission control lines, respectively; and a data driver which supplies a data signal to the data line. The pixel includes: a light emitting element; a first transistor connected between a first node and a second node and which generates a driving current flowing from a first power supply line, through which a first power supply voltage is supplied, to a second power supply line, through which a second power supply voltage is supplied, and flowing through the light emitting element; a second transistor connected between the data line and the first node and which is turned on in response to the fourth scan signal; a third transistor connected between the second node and a third node and which is turned on in response to the second scan signal, where the third node is connected to a gate electrode of the first transistor; a fourth transistor connected between the second node and a third power line through which a third power supply voltage is supplied, and which is turned on in response to the first scan signal; a fifth transistor connected between the first node and a fourth node and which is turned on in response to the third scan signal; a sixth transistor connected between the first power line and the first node and which is turned off in response to the first emission control signal supplied to the first emission control line; a storage capacitor connected between the third node and the fourth node; and a first capacitor connected between the first power line and the fourth node.

In an embodiment, the third transistor and the fifth transistor may be oxide semiconductor transistors.

In an embodiment, gate-on levels of the second scan signal and the third scan signal may be different from a gate-on level of the fourth scan signal.

In an embodiment, a pulse width of the third scan signal may be equal to a pulse width of the second scan signal and may be greater than each of pulse widths of the first scan signal and the fourth scan signal.

In an embodiment, the pixel may further include a seventh transistor connected between the second node and a first electrode of the light emitting element and which is turned off in response to the second emission control signal supplied to the second emission control line.

In an embodiment, the emission driver may stop the supply of the first emission control signal in each of a plurality of compensation periods of a first non-emission period of one frame, and may supply the second emission control signal without interruption during the first non-emission period.

In an embodiment, the emission driver may supply the first emission control signal and the second emission control signal without interruption during a second non-emission period of the one frame.

In an embodiment, the emission driver may include: a first emission driver which supplies the first emission control signal to the first emission control line; and a second emission driver which supplies the second emission control signal to the second emission control line.

In an embodiment, the scan driver may supply the first scan signal to the first scan line a plurality of times in the first non-emission period, and periods in which the first scan signal is supplied and the compensation periods may be alternately repeated in the first non-emission period.

In an embodiment, the scan driver may supply the second scan signal and the third scan signal in the compensation periods.

In an embodiment, the pixel may further include: an eighth transistor connected between the first electrode of the light emitting element and a fourth power line through which a fourth power supply voltage is supplied, and which is turned on in response to the fifth scan signal.

In an embodiment, the pixel may further include: a ninth transistor connected between the first node and a fifth power line through which a fifth power supply voltage is supplied, and which is turned on in response to the fifth scan signal.

In an embodiment, the pixel may further include: a second capacitor connected between the fourth node and one of the first scan line, the fourth scan line, and the fifth scan line.

According to embodiments, a pixel includes: a light emitting element; a first transistor connected between a first node and a second node and which generates a driving current flowing from a first power supply line to a second power supply line and flowing through the light emitting element, where the first power supply line is configured to supply a first power supply voltage, and the second power supply line is configured to supply a second power supply voltage; a second transistor connected between a data line and the first node and which is turned on in response to a fourth scan signal supplied to a fourth scan line; a third transistor connected between the second node and a third node and which is turned on in response to a second scan signal supplied to a second scan line, where the third node is connected to a gate electrode of the first transistor; a fourth transistor connected between the second node and a third power line through which a third power supply voltage is supplied, and which is turned on in response to a first scan signal supplied to a first scan line; a fifth transistor connected between the first node and the fourth node and which is turned on in response to the second scan signal supplied to the second scan line; a sixth transistor connected between the first power line and the first node and which is turned off in response to a first emission control signal supplied to a first emission control line; a storage capacitor connected between the third node and the fourth node; and a first capacitor connected between the first power line and the fourth node.

In an embodiment, the third transistor and the fifth transistor may be n-type oxide semiconductor transistors, and the first transistor, the second transistor, and the fourth transistor may be p-type polysilicon semiconductor transistors.

In an embodiment, the pixel may further include: a seventh transistor connected between the second node and a first electrode of the light emitting element and which is turned off in response to a second emission control signal supplied to a second emission control line. The sixth transistor may be repeatedly turned on and off during a non-emission period, and the seventh transistor may maintain a turned-off state during the non-emission period.

In an embodiment, the fourth transistor and the sixth transistor may alternately repeat in a turned-on state during the non-emission period.

In an embodiment, the pixel may further include: an eighth transistor connected between the first electrode of the light emitting element and a fourth power line through which a fourth power supply voltage is supplied, and which is turned on in response to a fifth scan signal supplied to a fifth scan line; and a ninth transistor connected between the first node and a fifth power line through which a fifth power supply voltage is supplied, and which is turned on in response to the fifth scan signal.

In an embodiment, the pixel may further include a second capacitor connected between the fourth node and one of the first scan line, the fourth scan line, and the fifth scan line.

In an embodiment, the pixel may further include a second capacitor connected between the third node and one of the first scan line, the fourth scan line, and the fifth scan line.

DETAILED DESCRIPTION

Figure 1:
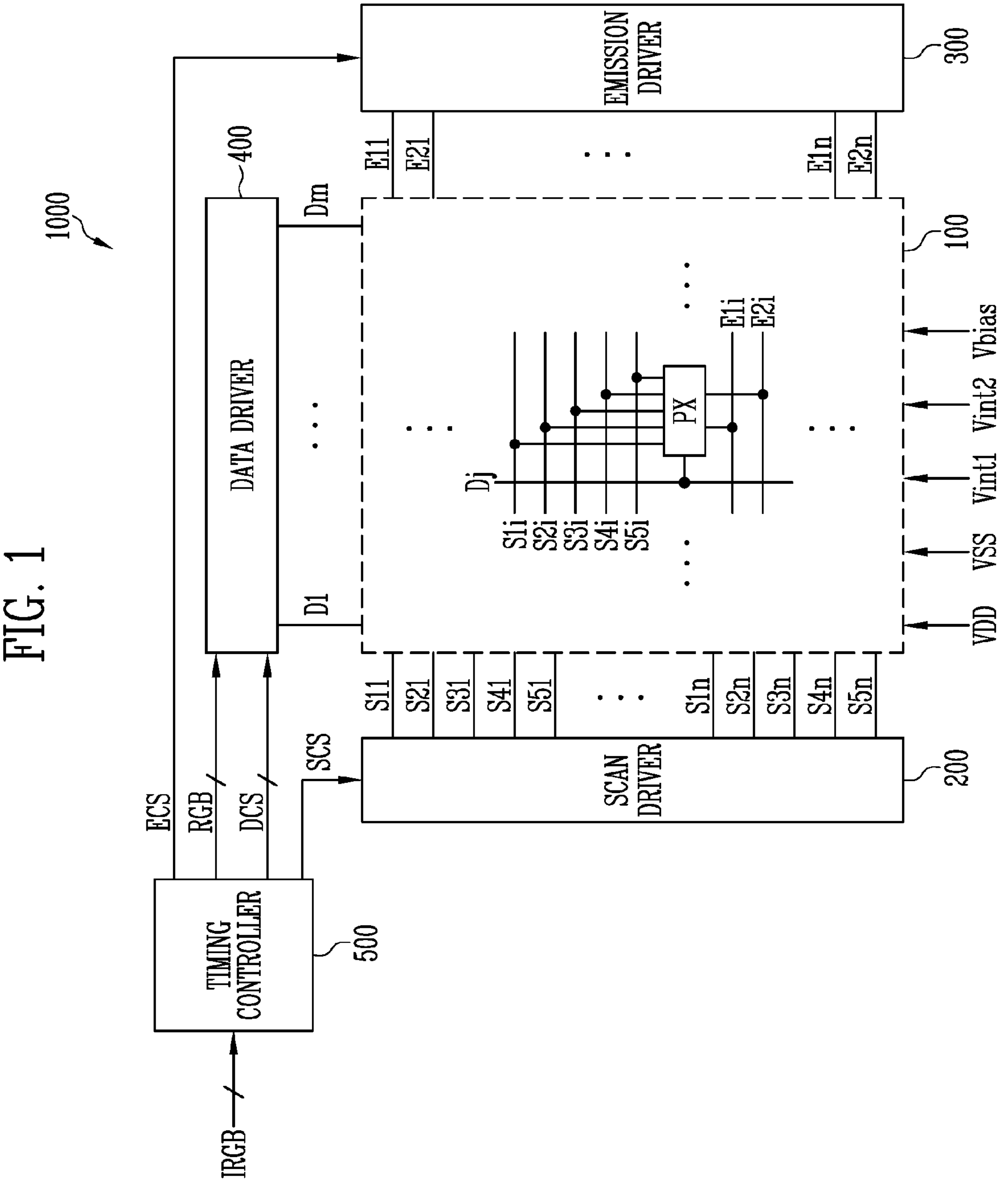
FIG. 1 is a block diagram illustrating a display device according to embodiments of the present invention.

It will be understood that when an element is referred to as being "connected to" another element, it can be directly connected to the other element or intervening elements may be present therebetween. In contrast, when an element is referred to as being "directly connected to" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About", "approximately" or "substantially equal" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value. Hereinafter, preferred embodiments of the present invention will be described in more detail with reference to the accompanying drawings. The same reference numerals are used to refer to the same elements in the drawings, and redundant descriptions thereof are omitted.

FIG. 1 is a block diagram illustrating a display device according to embodiments of the present invention.

Referring to FIG. 1, a display device 1000 may include a display unit 100, a scan driver 200, an emission driver 300, a data driver 400, and a timing controller 500.

The display device 1000 may display an image at various frame frequencies (refresh rates, driving frequencies, or screen refresh rates) according to driving conditions. The frame frequency is a frequency at which a data voltage is substantially written to a driving transistor (e.g., first transistor M1 in FIG. 4) of a pixel PX for 1 second. For example, the frame frequency is also referred to as a screen scan rate or a screen refresh rate, and represents a frequency at which a display screen is reproduced for 1 second.

In an embodiment, the output frequency of the data driver 400 and/or a fourth scan signal supplied to a fourth scan line S4*i* for supplying a data signal may be changed corresponding to the frame frequency. For example, a frame frequency for driving a moving image may be a frequency of about 60 Hertz (Hz) or more (for example, 60 Hz, 120 Hz, 240 Hz, 360 Hz, 480 Hz, and the like). When the frame frequency is 60 Hz, the fourth scan signal may be supplied to each horizontal line (pixel row) 60 times per second.

In an embodiment, the display device 1000 may control the output frequencies of the scan driver 200 and the emission driver 300 and the corresponding output frequency of the data driver 400 according to driving conditions. For example, the display device 1000 may display images corresponding to various frame frequencies of 1 Hz to 240 Hz. However, this is an example, and the display device 1000 may display images even at a frame frequency of 240 Hz or more (for example, 300 Hz or 480 Hz) in another embodiment.

The display unit 100 may include scan lines S11 to S1*n*, S21 to S2*n*, S31 to S3*n*, S41 to S4*n*, and S51 to Syn, emission control lines E11 to E1*n* and E21 to E2*n*, and data lines D1 to Dm, and may include pixels PXs connected thereto (m and n are integers greater than 1). Each of the pixels PX may include a driving transistor (e.g., first transistor M1) and a plurality of switching transistors.

The timing controller 500 may receive input image data IRGB and control signals from a host system such as an application processor ("AP") through a predetermined interface. The timing controller 500 may control driving timings of the scan driver 200, the emission driver 300, and the data driver 400.

The timing controller 500 may generate a first control signal SCS, a second control signal ECS, and a third control signal DCS based on the input image data IRGB, the control signals, and a clock signal. The first control signal SCS may be supplied to the scan driver 200, the second control signal ECS may be supplied to the emission driver 300, and the third control signal DCS may be supplied to the data driver 400. The timing controller 500 may rearrange the input image data IRGB and supply the rearranged input image data (i.e., digital image data RGB) to the data driver 400.

The scan driver 200 may receive the first control signal SCS from the timing controller 500, and may supply a first scan signal, a second scan signal, a third scan signal, a fourth scan signal, and a fifth scan signal to first scan lines S11 to S1*n*, second scan lines S21 to S2*n*, third scan lines S31 to S3*n*, fourth scan lines S41 to S4*n*, and fifth scan lines S51 to S5*n* based on the first control signal SCS, respectively.

The first to fifth scan signals may be set to a gate-on level corresponding to the types of transistors to which the scan signals are supplied. The transistor receiving the scan signal may be set to a turn-on state when the scan signal is supplied. For example, a gate-on level of a scan signal supplied to a P-channel metal oxide semiconductor ("PMOS") transistor may be a logic low level, and a gate-on level of a scan signal supplied to an N-channel metal oxide semiconductor ("NMOS") transistor may be a logic high level. Hereinafter, the phrase "a scan signal is supplied" may be understood to mean that a scan signal is supplied at a logic level that turns on a transistor controlled thereby.

In an embodiment, the scan driver 200 may supply some of the first to fifth scan signals a plurality of times in a non-emission period. Therefore, the bias state of the driving transistor included in the pixel PX may be controlled.

The emission driver 300 may supply a first emission control signal and a second emission control signal to the first emission control lines E11 to E1*n* and the second emission control lines E21 to E2*n* based on the second control signal ECS, respectively.

The first and second emission control signals may be set to a gate-off voltage (for example, a high voltage). The transistor receiving the first emission control signal or the second emission control signal of the gate-off voltage may be turned off when the emission control signal is supplied, and may be set to a turned-on state in other cases. Hereinafter, the phrase "an emission control signal is supplied" may be understood to mean that an emission control signal is supplied at a logic level (for example, a high level) that turns off a transistor controlled thereby.

Although FIG. 1 illustrates that each of the scan driver 200 and the emission driver 300 has a single configuration for convenience of explanation, the present invention is not limited thereto. According to a design in another embodiment, the scan driver 200 may include a plurality of scan drivers that supply at least one of the first to fifth scan signals, respectively. In addition, at least a part of the scan driver 200 and the emission driver 300 may be integrated into a single driving circuit, module, or the like.

The data driver 400 may receive the third control signal DCS and the image data RGB from the timing controller 500. The data driver 400 may convert digital image data RGB into an analog data signal (data voltage). The data driver 400 may supply a data signal to the data lines D1 to Dm in response to the third control signal DCS. In this case, the data signal supplied to the data lines D1 to Dm may be supplied in synchronization with the fourth scan signal supplied to the fourth scan lines S41 to S4*n*.

In an embodiment, the display device 1000 may further include a power supply. The power supply may supply, to the display unit 100, a first power supply voltage VDD, a second power supply voltage VSS, a third power supply voltage Vint1 (for example, a first initialization voltage), a fourth power supply voltage Vint2 (for example, a second initialization voltage), and a fifth power supply voltage Vbias (for example, a bias voltage) for driving the pixels PX.

On the other hand, the display device 1000 may operate at various frame frequencies. In the case of low-frequency driving, image defects such as flicker may be recognized due to current leakage inside the pixel. In addition, an afterimage such as image drag may be recognized according to a change in the bias state of the driving transistor due to driving at various frame frequencies or a change in a response time due to a threshold voltage shift due to a change in hysteresis characteristics.

In order to improve image quality, one frame period of the pixel PX may include non-emission periods and emission periods according to the frame frequency. For example, the first non-emission period and emission period of one frame may be defined as a first driving period, and a subsequent non-emission period and emission period may be defined as a second driving period.

For example, a data signal for displaying an image may be substantially written to the pixel PX in the first driving period, and an on-bias state may be applied to the driving transistor of the pixel PX in the second driving period (a state capable of being turned on).

On the other hand, in the case of high-speed driving at a frame frequency of 120 Hz or more, a threshold voltage compensation time of the driving transistor has to be sufficiently secured in order to implement the minimum criterion of image quality. The pixel PX and the display device 1000 according to embodiments of the present invention may display high-quality images at various frame frequencies while securing a sufficient threshold voltage compensation time.

Figure 2:
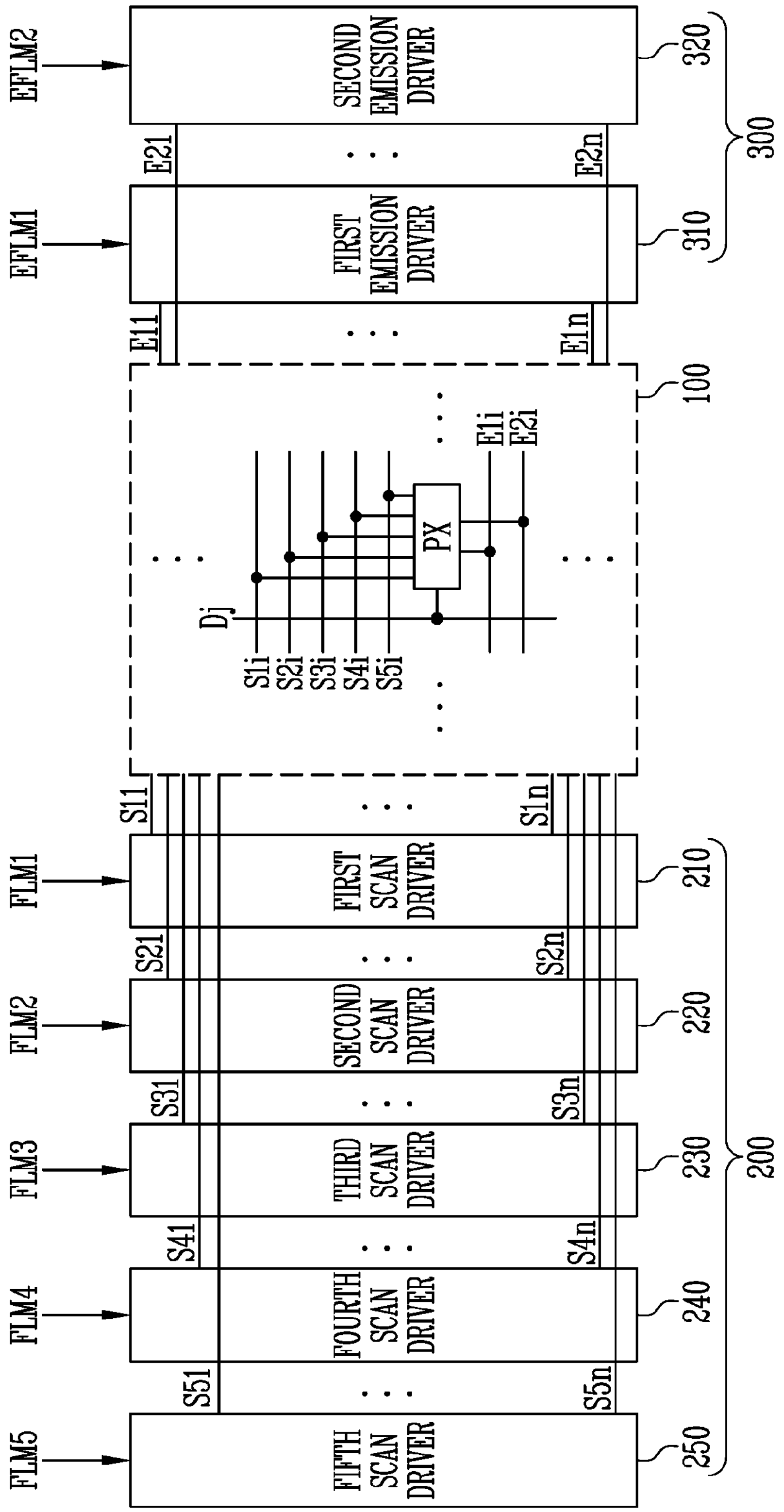
FIG. 2 is a diagram illustrating an example of a scan driver and an emission driver included in the display device of FIG. 1.

FIG. 2 is a diagram illustrating an example of the scan driver and the emission driver included in the display device of FIG. 1.

Referring to FIGS. 1 and 2, the scan driver 200 may include a first scan driver 210, a second scan driver 220, a third scan driver 230, a fourth scan driver 240, and a fifth scan driver 250.

In an embodiment, each of the first to fifth scan drivers 210, 220, 230, 240, and 250 may include stage circuits connected separately and dependently.

The first control signal SCS may include first to fifth scan start signals FLM1 to FLM5. The first to fifth scan start signals FLM1 to FLM5 may be supplied to the first to fifth scan drivers 210, 220, 230, 240, and 250, respectively.

The pulse widths and supply timings of the first to fifth scan start signals FLM1 to FLM5 may be determined according to the frame frequency and the driving condition of the pixel PX.

The first to fifth scan signals may be output based on the first to fifth scan start signals FLM1 to FLM5, respectively. For example, a signal width of at least one of the first to fifth scan signals may be different from a signal width of the others thereof. In addition, at least one of the first to fifth scan signals may be output a plurality of times during the non-emission period.

Furthermore, the gate-on levels of the first to fifth scan signals may be determined according to the type of the corresponding transistor. For example, gate-on levels of the second scan signal and the third scan signal may be different from a gate-on level of the fourth scan signal.

The first scan driver 210 may supply the first scan signal to the first scan lines S11 to Sin in response to the first scan start signal FLM1. The second scan driver 220 may supply the second scan signal to the second scan lines S21 to S1*n* in response to the second scan start signal FLM2. The third scan driver 230 may supply the third scan signal to the third scan lines S31 to S3*n* in response to the third scan start signal FLM3. The fourth scan driver 240 may supply the fourth scan signal to the fourth scan lines S41 to S4*n* in response to the fourth scan start signal FLM4. The fifth scan driver 250 may supply the fifth scan signal to the fifth scan lines S51 to S5*n* in response to the fifth scan start signal FLM5.

In an embodiment, the emission driver 300 may include a first emission driver 310 and a second emission driver 320.

The second control signal ECS may include first and second emission control start signals EFLM1 and EFLM2. The first and second emission control start signals EFLM1 and EFLM2 may be supplied to the first and second emission drivers 310 and 320, respectively.

In an embodiment, each of the first and second emission drivers 310 and 320 may include stage circuits connected separately and dependently. In addition, the pulse width and supply timing of the first emission control signal may be different from the pulse width and supply timing of the second emission control signal.

The first emission driver 310 may supply the first emission control signal to the first emission control lines E11 to E1*n* in response to the first emission control start signal EFLM1. The second emission driver 320 may supply the second emission control signal to the second emission control lines E21 to E2*n* in response to the second emission control start signal EFLM2.

Figure 3:
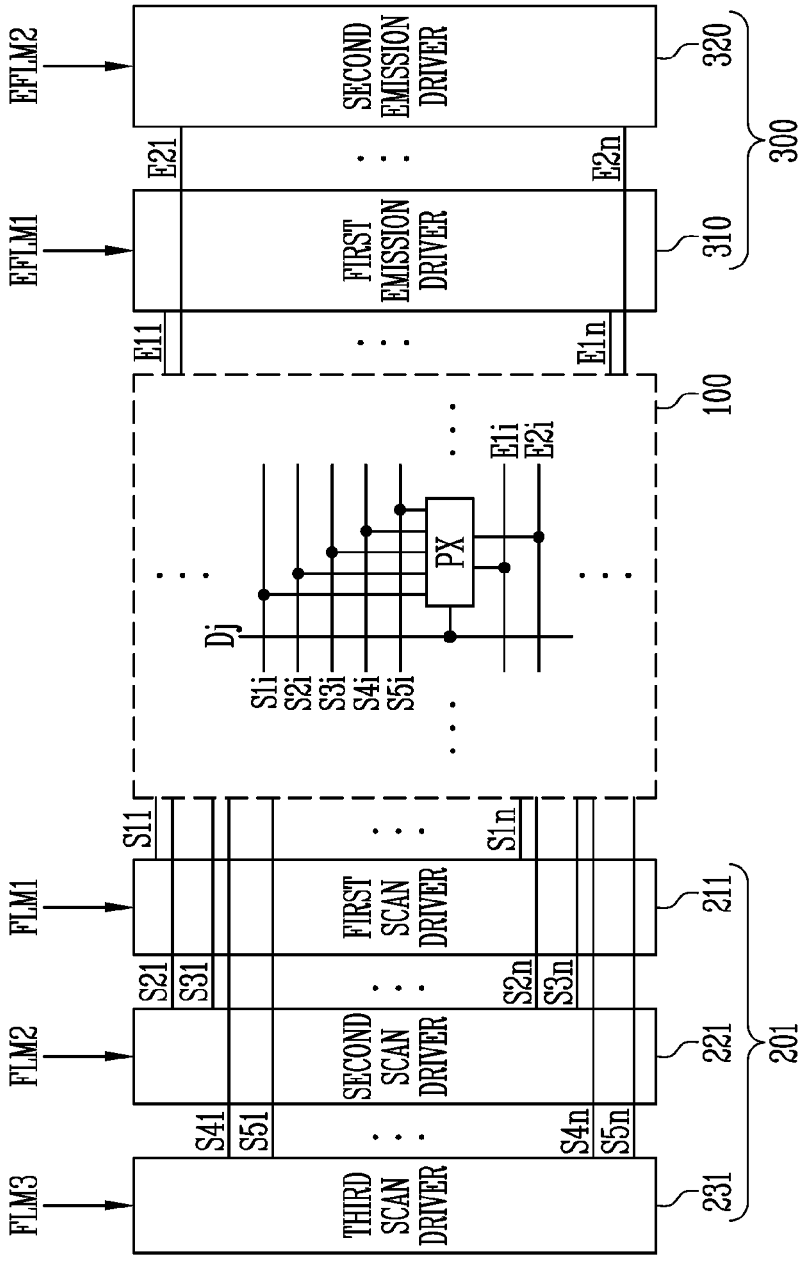
FIG. 3 is a diagram illustrating another example of a scan driver and an emission driver included in the display device of FIG. 1.

FIG. 3 is a diagram illustrating another example of the scan driver and the emission driver included in the display device of FIG. 1.

Since the display device of FIG. 3 is substantially the same as or similar to the contents described with reference to FIG. 2, except for a scan driver 201, the same reference numerals are used to refer to the same or corresponding components and redundant descriptions thereof are omitted.

Referring to FIGS. 1 and 3, the scan driver 201 may include a first scan driver 211, a second scan driver 221, and a third scan driver 231.

In an embodiment, the second scan driver 221 may supply a second scan signal to second scan lines S21 to S2*n* and a third scan signal to third scan lines S31 to S3*n*, based on a second scan start signal FLM2. A pulse width of the third scan signal may be equal to a pulse width of the second scan signal. For example, the third scan signal supplied to the same pixel may be a signal obtained by shifting the second scan signal. For example, the third scan line (for example, S3*i*) connected to an i-th pixel row (where i is a natural number) may be connected to the second scan line (for example, S2*i*+k) connected to an (i+k)-th pixel row (where k is a natural number).

In an embodiment, the third scan driver 231 may supply a fourth scan signal to fourth scan lines S41 to S4*n* and a fifth scan signal to fifth scan lines S51 to Syn, based on a third scan start signal FLM3. A pulse width of the fifth scan signal may be equal to a pulse width of the fourth scan signal. For example, the fifth scan signal supplied to the same pixel may be a signal obtained by shifting the fourth scan signal. For example, the fifth scan line (for example, S5*i*) connected to an i-th pixel row (where i is a natural number) may be connected to the fourth scan line (for example, S4*i*+j) connected to an (i+j)-th pixel row (where j is a natural number).

Therefore, the size of the scan driver 201 included in the display device 1000 and wiring complexity of the display device 1000 may be reduced, and manufacturing costs may be reduced.

However, this is only an example, and the fourth scan signal and the fifth scan signal may be output from different scan drivers in another embodiment. For example, the third scan driver 231 may supply the fourth scan signal to the fourth scan lines S41 to S4*n*, and an additional fourth scan driver may supply the fifth scan to the fifth scan lines S51 to Syn.

Figure 4:
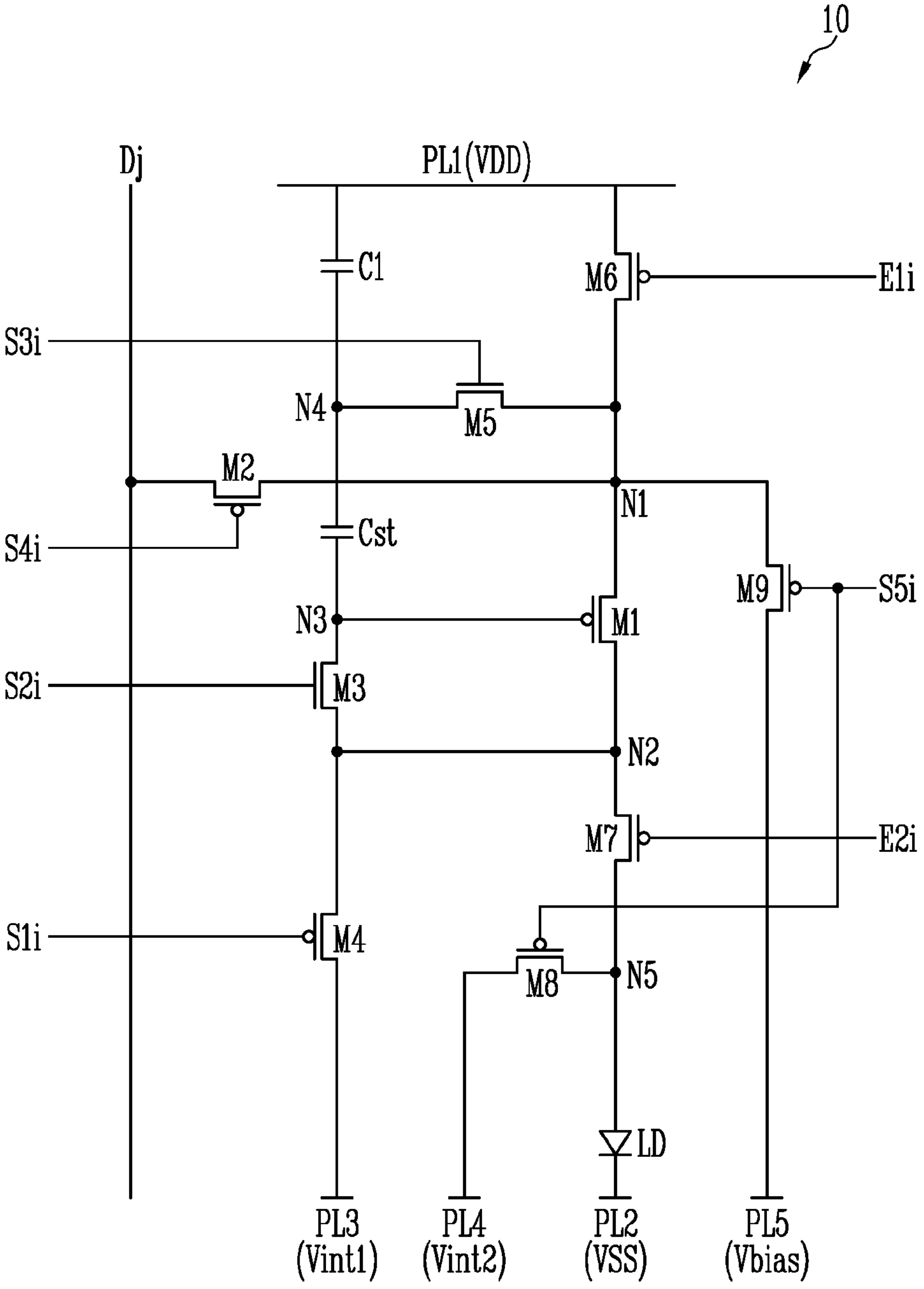
FIG. 4 is a circuit diagram illustrating an example of a pixel included in the display device of FIG. 1.

FIG. 4 is a circuit diagram illustrating an example of a pixel included in the display device of FIG. 1.

For convenience of explanation, FIG. 4 illustrates that a pixel 10 is positioned on an i-th horizontal line (or an i-th pixel row) and connected to a j-th data line Dj (where i and j are natural numbers).

Referring to FIGS. 1 and 4, the pixel 10 may include a light emitting element LD, first to ninth transistors M1 to M9, a storage capacitor Cst, and a first capacitor C1.

A first electrode (for example, an anode electrode) of the light emitting element LD may be connected to a fifth node N5, and a second electrode (for example, a cathode electrode) of the light emitting element LD may be connected to a second power line PL2 through which a second power supply voltage VSS is transmitted. The light emitting element LD may emit light having a predetermined luminance according to the amount of current supplied from the transistor M1.

The second power line PL2 may have a line shape, but is not limited thereto. For example, the second power line PL2 may be a conductive layer having a conductive plate shape.

In an embodiment, the light emitting element LD may be an organic light emitting diode including an organic emission layer. In another embodiment, the light emitting element LD may be an inorganic light emitting element including an inorganic material. In another embodiment, the light emitting element LD may be a light emitting element including an inorganic material and an organic material in combination. Alternatively, the light emitting element LD may have a structure in which a plurality of inorganic light emitting elements are connected in parallel and/or in series between the second power line PL2 and the fifth node N5.

A first electrode of the first transistor M1 (or the driving transistor) may be connected to a first node N1, and a second electrode of the first transistor M1 may be connected to a second node N2. A gate electrode of the first transistor M1 may be connected to a third node N3. The first transistor M1 may control the driving current flowing from the first power line PL1, through which a first power supply voltage VDD is supplied, to the second power line PL2, through which a second power supply voltage VSS is supplied via the light emitting element LD, in response to the voltage of the third node N3. For example, the first power supply voltage VDD may be set to be higher than the second power supply voltage VSS.

The second transistor M2 may be connected between a j-th data line Dj (hereinafter, referred to as a "data line") and the first node N1. A gate electrode of the second transistor M2 may be connected to an i-th fourth scan line S4*i* (hereinafter, referred to as a "fourth scan line"). When the fourth scan signal is supplied to the fourth scan line S4*i*, the second transistor M2 may be turned on to electrically connect the data line Dj to the first node N1.

The third transistor M3 may be connected between the second electrode of the first transistor M1 (that is, the second node N2) and the third node N3 (that is, the second electrode of the first transistor M1). A gate electrode of the third transistor M3 may be connected to an i-th second scan line S2*i* (hereinafter, referred to as a "second scan line").

When the second scan signal is supplied to the second scan line S2*i*, the third transistor M3 may be turned on to electrically connect the second electrode of the first transistor M1 to the third node N3. That is, a timing at which the second electrode (for example, a drain electrode) of the first transistor M1 is connected to the gate electrode of the first transistor M1 may be controlled by the second scan signal. When the third transistor M3 is turned on, the first transistor M1 may be diode-connected.

The fourth transistor M4 may be connected between the second node N2 and a third power supply line PL3 through which a third power supply voltage Vint1 (for example, a first initialization voltage) is supplied. A gate electrode of the fourth transistor M4 may be connected to an i-th first scan line S1*i* (hereinafter, referred to as a "first scan line").

When the first scan signal is supplied to the first scan line S1*i*, the fourth transistor M4 may be turned on to supply the third power supply voltage Vint1 to the second node N2. For example, the third power supply voltage Vint1 may be set to a voltage lower than the lowest level of the data signal supplied to the data line Dj.

The fifth transistor M5 may be connected between the first node N1 and the fourth node N4. A gate electrode of the fifth transistor M5 may be connected to an i-th third scan line S3*i* (hereinafter, referred to as a "third scan line").

When the third scan signal is supplied to the third scan line S3*i*, the fifth transistor M5 is turned on to supply the first power supply voltage VDD or the voltage of the data signal to the fourth node N4.

In an embodiment, the third transistor M3 and the fifth transistor M5 may be oxide semiconductor transistors. Each of the third transistor M3 and the fifth transistor M5 may include an oxide semiconductor layer as an active layer (semiconductor layer). For example, the third transistor M3 and the fifth transistor M5 may be n-type oxide semiconductor transistors.

The oxide semiconductor transistor may be processed at a low temperature and has a lower charge mobility than a polysilicon semiconductor transistor. That is, the oxide semiconductor transistor has excellent off-current characteristics. Therefore, when the third transistor M3 and the fifth transistor M5 are provided as oxide semiconductor transistors, it is possible to minimize leakage current through the third transistor M3 and the fifth transistor M5 according to low-frequency driving and variable frequency driving, thereby improving display quality.

The sixth transistor M6 may be connected between the first power line PL1 and the first node N1. A gate electrode of the sixth transistor M6 may be connected to an i-th first emission control line E1*i* (hereinafter, referred to as a "first emission control line").

The sixth transistor M6 may be turned off when the first emission control signal is supplied to the first emission control line E1*i*, and may be turned on in other cases. When the sixth transistor M6 is turned on, the first node N1 may be electrically connected to the first power line PL1.

The seventh transistor M7 may be connected between the second node N2 and the fifth node N5 (for example, the first electrode of the light emitting element LD). A gate electrode of the seventh transistor M7 may be connected to an i-th second emission control line E2*i* (hereinafter, referred to as a "second emission control line").

The seventh transistor M7 may be turned off when the second emission control signal is supplied to the second emission control line E2*i*, and may be turned on in other cases. When the seventh transistor M7 is turned on, the second node N2 and the fifth node N5 may be electrically connected to each other.

The eighth transistor M8 may be connected between the fifth node N5 and the fourth power line PL4 through which a fourth power supply voltage Vint2 is supplied. A gate electrode of the eighth transistor M8 may be connected to an i-th fifth scan line S5*i* (hereinafter, referred to as a "fifth scan line").

When the fifth scan signal is supplied to the fifth scan line S5*i*, the eighth transistor M8 is turned on to supply the fourth power supply voltage Vint2 (for example, the second initialization voltage) to the fifth node N5.

When the fourth power supply voltage Vint2 is supplied to the first electrode of the light emitting element LD (that is, the fifth node N5), a parasitic capacitor of the light emitting element LD may be discharged. As the residual voltage charged in the parasitic capacitor is discharged (removed), unintentional fine light emission may be prevented. Therefore, the black expression capability of the pixel 10 may be improved.

On the other hand, the third power supply voltage Vint1 and the fourth power supply voltage Vint2 may be different from each other. That is, the voltage for initializing the third node N3 and the voltage for initializing the fifth node N5 may be set differently.

When the third power supply voltage Vint1 supplied to the third node N3 is too low in the low-frequency driving in which the length of one frame period increases, a strong on-bias state is applied to the first transistor M1, and thus a threshold voltage of the first transistor M1 in the corresponding frame period is shifted. Such a hysteresis characteristic may cause a flicker phenomenon in the low-frequency driving. Therefore, in the low-frequency-driving display device, the third power supply voltage Vint1 higher than the second power supply voltage VSS may be desirable.

However, when the fourth power supply voltage Vint2 supplied to the fifth node N5 is higher than a predetermined reference, the voltage of the parasitic capacitor of the light emitting element LD may be charged rather than discharged. Therefore, the fourth power supply voltage Vint2 is desirable to be lower than the second power supply voltage VSS.

However, this is only an example, and the third power supply voltage Vint1 and the fourth power supply voltage Vint2 may be substantially equal to each other in another embodiment.

The ninth transistor M9 may be connected between the first node N1 and the fifth power line PL5 through which a fifth power supply voltage Vbias (for example, a bias voltage) is supplied. A gate electrode of the ninth transistor M9 may be connected to the fifth scan line S5*i*.

When the fifth scan signal is supplied to the fifth scan line S5*i*, the ninth transistor M9 is turned on to supply the fifth power supply voltage Vbias to the first node N1. In an embodiment, the fifth power supply voltage Vbias may be at a level similar to a data voltage of a black gray scale. For example, the fifth power supply voltage Vbias may be about 5 volts (V) to about 7 V.

Therefore, when the ninth transistor M9 is turned on, a predetermined high voltage may be applied to a source electrode of the first transistor M1. At this time, when the third transistor M3 is in a turned-off state, the first transistor M1 may have an on-bias state (a state capable of being turned on) (that is, on-biased).

As the fifth power supply voltage Vbias is periodically supplied to the first node N1, the bias state of the first transistor M1 may be periodically changed and the threshold voltage characteristic of the first transistor M1 may be changed. Therefore, the first transistor M1 degradation for the reason that the characteristics of the first transistor M1 are fixed to a specific state in low-frequency driving may be prevented.

The storage capacitor Cst may be connected between the third node N3 and the fourth node N4. The storage capacitor Cst may store a voltage difference between the third node N3 and the fourth node N4.

The first capacitor C1 may be connected between the first power line PL1 and the fourth node N4. The first power supply voltage VDD, which is a constant voltage, may be continuously supplied to one electrode of the first capacitor C1. Therefore, the voltage of the fourth node N4 may not be affected by other parasitic capacitors, and voltage levels directly supplied to the fourth node N4 may be maintained. That is, the first capacitor C1 may function as a hold capacitor.

Some transistors of the pixel 10 may be polysilicon semiconductor transistors. For example, the first, second, fourth, sixth, seventh, eighth, and ninth transistors M1, M2, M4, M6, M7, M8, and M9 may include polysilicon semiconductor layers formed through a low temperature polysilicon ("LTPS") process as active layers (channels). Since the polysilicon semiconductor transistor has an advantage of a fast response time, the polysilicon semiconductor transistor may be applied to a switching device for fast switching.

However, this is an example, and the types and kinds of transistors according to the invention are not limited to the above-described examples.

Figure 5:
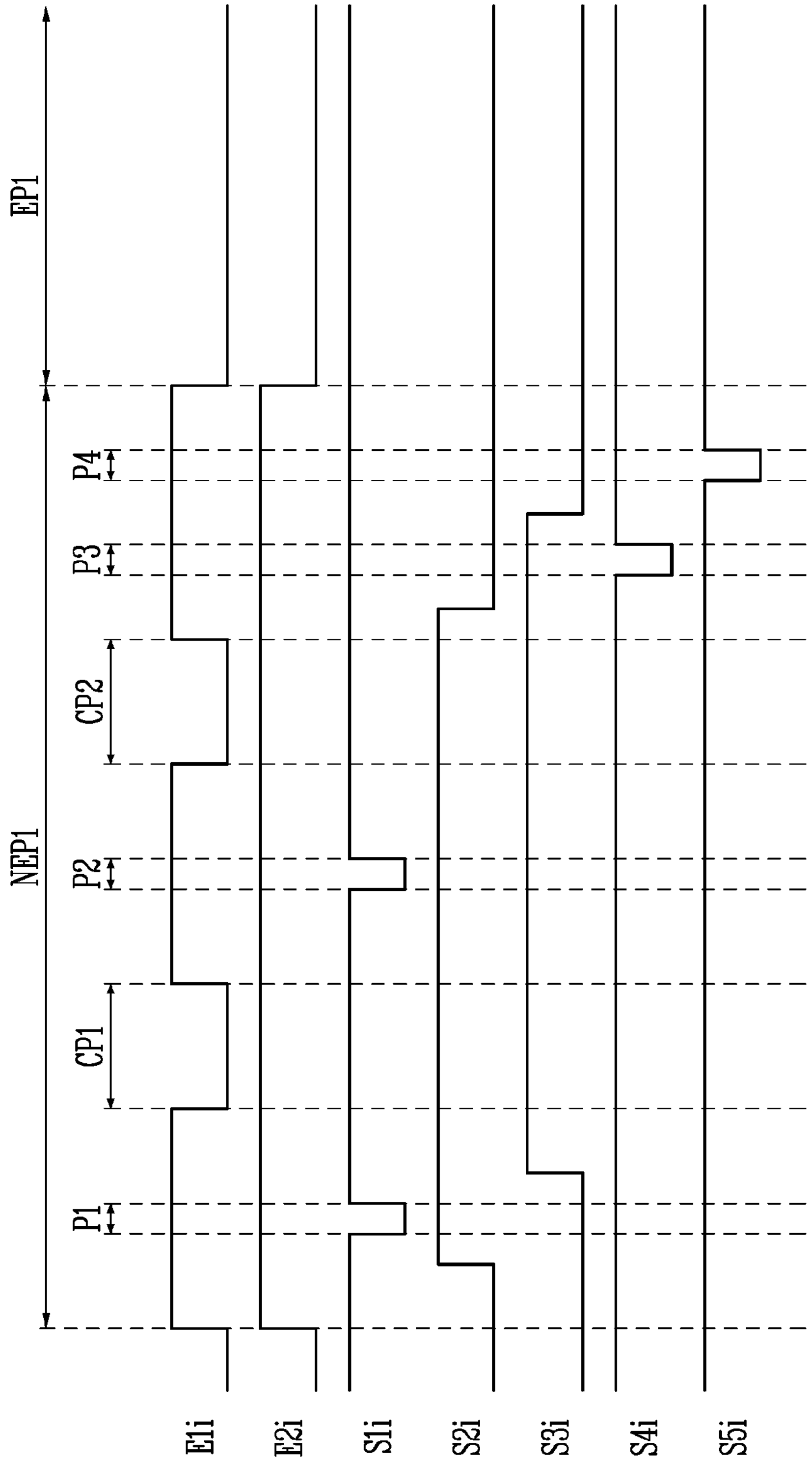
FIG. 5 is a timing diagram illustrating an example of signals supplied to the pixel of FIG. 4 in a first driving period.
Figure 6:
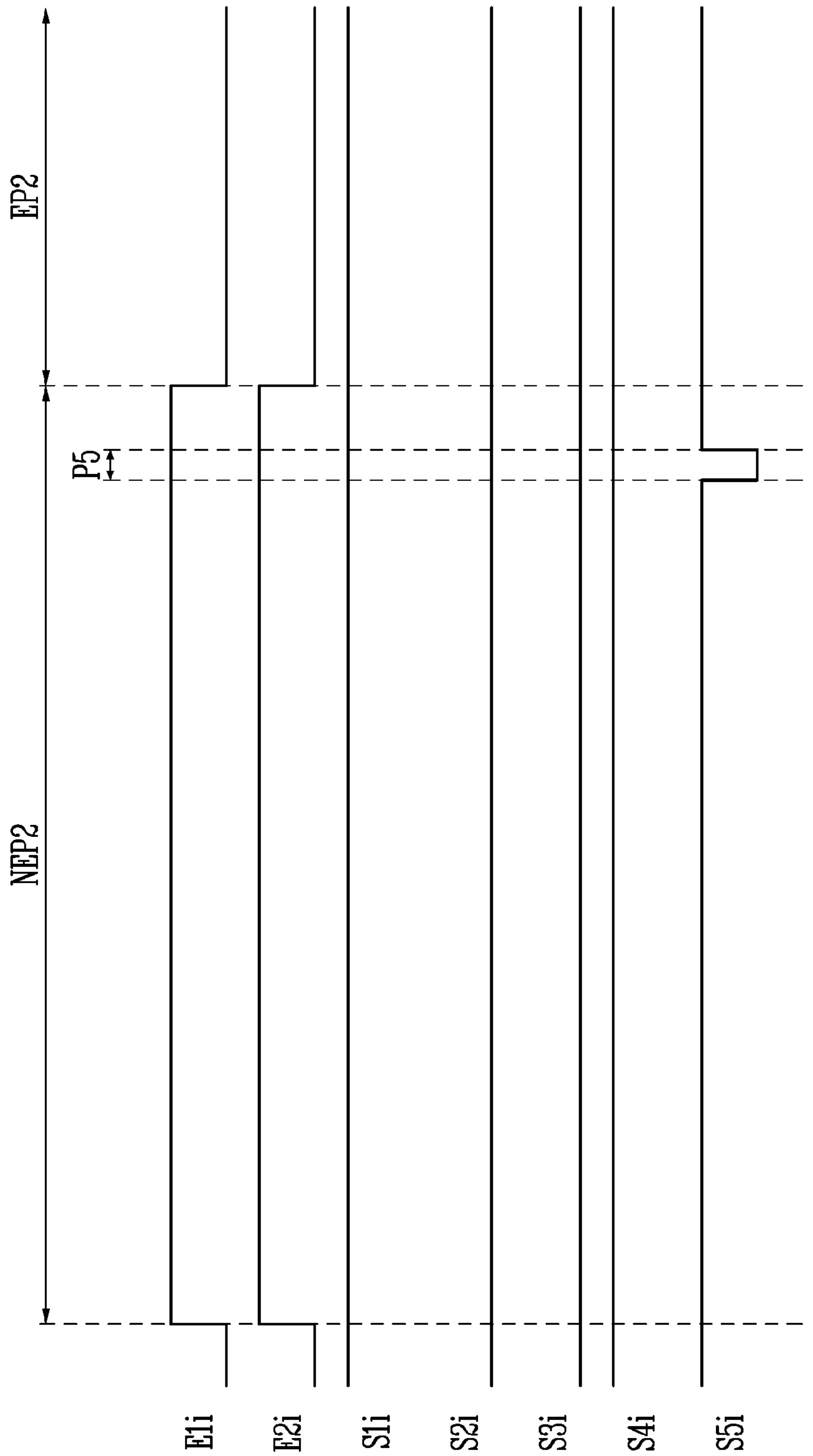
FIG. 6 is a timing diagram illustrating an example of signals supplied to the pixel of FIG. 4 in a second driving period.

FIG. 5 is a timing diagram illustrating an example of signals supplied to the pixel of FIG. 4 in a first driving period, and FIG. 6 is a timing diagram illustrating an example of signals supplied to the pixel of FIG. 4 in a second driving period.

Referring to FIGS. 4, 5, and 6, the pixel 10 may operate through a first driving period DP1 or a second driving period DP2.

In variable frequency driving for controlling the frame frequency, one frame period may include the first driving period DP1. In addition, the second driving period DP2 may be omitted or may proceed at least once depending on the frame frequency.

The first driving period DP1 may include a first non-emission period NEP1 and a first emission period EP1. The second driving period DP2 may include a second non-emission period NEP2 and a second emission period EP2.

The first driving period DP1 may include a period (for example, a third period P3) in which a data signal actually corresponding to an output image is written. A data signal is not supplied in the second driving period DP2, and a fifth scan signal may be supplied in order to control the first transistor M1 of the pixel 10 to an on-bias state in a fifth period P5 of the second driving period DP2.

As illustrated in FIG. 5, the first non-emission period NEP1 may include first to fourth periods P1 to P4 and first and second compensation periods CP1 and CP2.

In an embodiment, the pulse width of the third scan signal supplied to the third scan line S3*i* may be equal to the width of the second scan signal supplied to the second scan line S2*i*. For example, the third scan signal supplied to the third scan line S3*i* may be a signal obtained by shifting the second scan signal supplied to the second scan line S2*i*. Therefore, the third scan line S3*i* may share a scan signal with the second scan line S2*i*+k of the (i+k)-th pixel row, where k is a natural number.

In an embodiment, each of the pulse widths of the second and third scan signals may be greater than each of the pulse width of the first scan signal, the pulse width of the fourth scan signal, and the pulse width of the fifth scan signal.

The second and third scan signals supplied to the n-type oxide semiconductor transistors may be at a high level, and the first scan signal, the fourth scan signal, and the fifth scan signal supplied to the p-type polysilicon semiconductor transistors may be at a low level.

In an embodiment, the pulse width of the fourth scan signal supplied to the fourth scan line S4*i* may be equal to the pulse width of the fifth scan signal supplied to the fifth scan line S5*i*. For example, the fourth scan signal supplied to the fourth scan line S4*i* may be a signal obtained by shifting the fifth scan signal supplied to the fifth scan line S5*i*. Therefore, the fourth scan line S4*i* may share a scan signal with the fifth scan line S5*i*+j of the (i+j)-th pixel row, where j is a natural number.

In an embodiment, the waveform of the first emission control signal may be different from the waveform of the second emission control signal in the first non-emission period NEP1. For example, the first emission control signal may be supplied a plurality of times during the first non-emission period NEP1. In the first and second compensation periods CP1 and CP2, the supply of the first emission control signal may be stopped (that is, the first emission control signal may have a low level). The second emission control signal may be supplied during the first non-emission period NEP1 and may maintain a high level.

When the supply of the first and second emission control signals E1*i* and E1*i* is started (that is, transitioned to a high level), the first non-emission period NEP1 may be started.

Thereafter, in the first period P1, the first scan signal may be supplied to the first scan line S1*i* and the second scan signal may be supplied to the second scan line S2*i*. The supply of the second scan signal may be maintained before the third period P3. Although FIG. 5 illustrates that the first scan signal is supplied after the second scan signal is supplied, but the present invention is not limited thereto. For example, at the start of the first period P1, the second scan signal may simultaneously transition together with the first scan signal in another embodiment.

In the first period P1, the third transistor M3 and the fourth transistor M4 may be turned on, and the third power supply voltage Vint1 may be supplied to the third node N3. Therefore, the voltage of the third node N3 (that is, the gate voltage of the first transistor M1) may be initialized to the third power supply voltage Vint1. In this case, a voltage of a data signal of a previous frame (hereinafter referred to as a "previous data voltage") may be substantially maintained at the fourth node N4 by the voltage holding operation of the first capacitor C1. The first period P1 is a period for initializing the voltage of the third node N3 and may be understood as a first initialization period.

After the first period P1, the fourth transistor M4 may be turned off.

Thereafter, the third scan signal may be supplied to the third scan line S3*i*, and the fifth transistor M5 may be turned on. The supply of the third scan signal may be maintained before the fourth period P4.

After the third scan signal may be supplied, in the first compensation period CP1, the supply of the first emission control signal may be stopped, and the sixth transistor M6 may be turned on. Therefore, a current path from the first power line PL1 to the fourth node N4 via the sixth transistor M6 and the fifth transistor M5 may be formed, and the first power supply voltage VDD may be supplied to the fourth node N4.

In addition, since the third transistor M3 is in a turned-on state in the first compensation period CP1, the first transistor M1 may be diode-connected and the threshold voltage compensation of the first transistor M1 may be performed. That is, the first compensation period CP1 may be determined by the length of the period in which the first emission control signal is not supplied. For example, the first compensation period CP1 may be set to three or more horizontal periods. Therefore, a sufficient threshold voltage compensation time may be secured. However, this is an example, and the length of the first compensation period CP1 according to the invention is not limited thereto, and the design may be freely changed according to driving conditions or the like.

On the other hand, in the first compensation period CP1, the voltage of the fourth node N4 may be changed from the previous data voltage to the first power supply voltage VDD, and the voltage change amount of the fourth node N4 may be reflected in the third node N3 due to the coupling of the storage capacitor Cst. Therefore, the voltage of the third node N3 does not become the difference between the first power supply voltage VDD and the threshold voltage (hereinafter referred to as "Vth") of the first transistor M1, and may be reflected up to the voltage change due to the coupling.

That is, in the first compensation period CP1, complete threshold voltage compensation cannot be performed due to the influence of the previous data voltage.

When the first emission control signal is supplied again, the sixth transistor M6 may be turned off and the first compensation period CP1 may be ended.

Thereafter, in the second period P2, the first scan signal may be supplied again to the first scan line S1*i*, and the fourth transistor M4 may be turned on. Therefore, the voltage of the third node N3 may be initialized again to the third power supply voltage Vint1. In this case, the first power supply voltage VDD may be maintained at the fourth node N4 by the voltage hold operation of the first capacitor C1. The second period P2 is a period for initializing the voltage of the third node N3 again and may be understood as a second initialization period.

After the second period P2, the fourth transistor M4 may be turned off again.

Thereafter, in the second compensation period CP2, the supply of the first emission control signal may be stopped, and the sixth transistor M6 may be turned on again. Therefore, a current path from the first power line PL1 to the fourth node N4 via the sixth transistor M6 and the fifth transistor M5 may be formed, and the first power supply voltage VDD may be supplied to the fourth node N4.

In addition, since the third transistor M3 is in a turned-on state, the first transistor M1 may be diode-connected and the threshold voltage compensation of the first transistor M1 may be performed again. The second compensation period CP2 may be determined by the length of the period in which the first emission control signal is not supplied. For example, the second compensation period CP2 may be set to three or more horizontal periods.

Since the first power supply voltage VDD is already supplied to the fourth node N4 before the second compensation period CP2, the coupling effect of the storage capacitor Cst may be substantially removed. That is, since there is little change in the voltage of the fourth node N4, the voltage of the third node N3 may be changed to a difference (hereinafter, "VDD-Vth") between the first power supply voltage VDD and the threshold voltage Vth of the first transistor M1. Therefore, the threshold voltage Vth of the first transistor M1 may be stored in the storage capacitor Cst.

When the first emission control signal is supplied again, the sixth transistor M6 may be turned off and the second compensation period CP2 may be ended.

As such, based on the supply control of the first emission control signal, the initialization periods (for example, the first and second periods P1 and P2) and the compensation periods (for example, the first and second compensation periods CP1 and CP2) are alternately repeated to sufficiently secure the compensation time, and the influence of the previous data voltage may be effectively removed in the threshold voltage compensation. Therefore, the reliability of threshold voltage compensation in high-speed driving of a frame frequency of 120 Hz or more may be greatly improved.

On the other hand, although FIG. 5 illustrates that the sequence of the initialization period and the compensation period is repeated twice, the present invention is not limited thereto. For example, the sequence of the initialization period and the compensation period may be alternately repeated three or more times in another embodiment.

Thereafter, the supply of the second scan signal may be stopped and the third transistor M3 may be turned off. However, this is only an example, and the supply of the second scan signal may be stopped simultaneously with the end of the second compensation period CP2 in another embodiment.

In the third period P3, the fourth scan signal may be supplied to the fourth scan line S4*i* and the second transistor M2 may be turned on. In addition, in the third period P3, the fifth transistor M5 may be in a turned-on state. A voltage of a data signal of a current frame (for example, referred to as a current data voltage "Vdata") may be supplied to the fourth node N4 through the second transistor M2 and the fifth transistor M5.

The voltage of the fourth node N4 may be changed from the first power supply voltage VDD to the current data voltage Vdata in the third period P3. Due to the coupling of the storage capacitor Cst, the voltage of the third node N3 may have a value to which the coupling is reflected to the difference between the existing first power supply voltage VDD and the threshold voltage Vth of the first transistor M1 (for example, VDD−Vth+(Vdata−VDD)). That is, in the voltage of the third node N3, only a value of Vdata−Vth remains, and thereafter, the driving current may have a value corresponding to the data voltage Vdata.

Thereafter, the supply of the third scan signal may be stopped and the fifth transistor M5 may be turned off. Therefore, the voltage of the third node N3 and the voltage of the fourth node N4 may be maintained, respectively. However, this is only an example, and the supply of the third scan signal may be stopped simultaneously with the end of the third compensation period P3 in another embodiment.

In the fourth period P4, the fifth scan signal may be supplied to the fifth scan line S5*i*, and the eighth transistor M8 and the ninth transistor M9 may be turned on. When the eighth transistor M8 is turned on, the fourth power supply voltage Vint2 may be supplied to the fifth node N5, and the parasitic capacitor of the light emitting element LD may be discharged. When the ninth transistor M9 is turned on, the fifth power supply voltage Vbias may be supplied to the first node N1, and the first transistor M1 may be controlled to an on-bias state before light emission of the light emitting element LD.

Thereafter, the supply of the first and second emission control signals may be stopped, so that the first non-emission period NEP1 may be ended and the first emission period EP1 may start. In the first emission period EP1, the sixth and seventh transistors M6 and M7 may be turned on.

In the first emission period EP1, a driving current corresponding to the current data voltage Vdata written in the first transistor M1 in the fourth period P4 may be supplied to the light emitting element LD, and the light emitting element LD may emit light based on the driving current.

As illustrated in FIG. 6, the second driving period DP2 may include a second non-emission period NEP2 and a second emission period EP2.

In an embodiment, the first and second emission control signals may be supplied without interruption during the second non-emission period NEP2. That is, during the second non-emission period NEP2, the first and second emission control signals may have a high level.

In an embodiment, in the second non-emission period NEP2, the first to fourth scan signals may not be supplied and the second to seventh transistors M2 to M7 may be in a turned-off state.

In the second non-emission period NEP2, the fifth scan signal may be supplied to the fifth scan line S5*i*, and the eighth and ninth transistors M8 and M9 may be turned on. Therefore, according to the insertion/progression of the second driving period DP2, the first transistor M1 may be periodically controlled to an on-bias state.

As described above, the pixel 10 and the display device 1000 including the same according to embodiments of the present invention may extend and secure the threshold voltage compensation time while removing the influence of the previous data voltage, through the control of the first emission control signal in the pixel circuit structure as illustrated in FIG. 4. Therefore, the image quality of high-speed driving at a frame frequency of 120 Hz or more may also be effectively improved. In addition, since the pixel 10 is driven using the first and second driving periods DP1 and DP2, image quality for various frame frequencies may be improved.

Figure 7A:
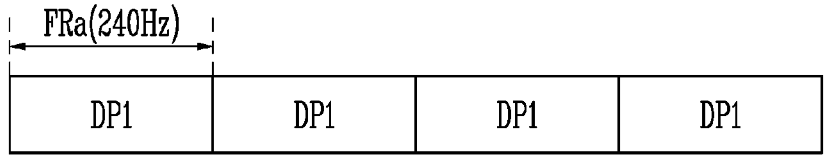
FIGS. 7A to 7C are diagrams for explaining examples of driving of the display device of FIG. 1 according to a frame frequency.
Figure 7B:
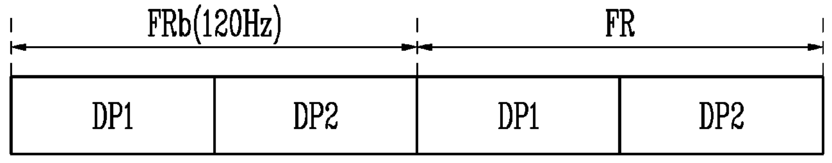
Figure 7C:
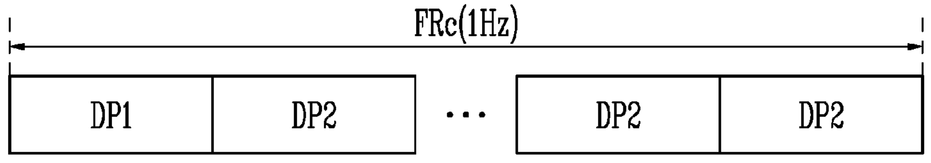

FIGS. 7A to 7C are diagrams for describing examples of driving of the display device of FIG. 1 according to a frame frequency.

Referring to FIGS. 1 and 5 to 7C, the display device 1000 may be driven at various frame frequencies.

The frequency of the first driving period DP1 may correspond to the frame frequency.

In an embodiment, as illustrated in FIG. 7A, a first frame FRa may include a first driving period DP1. For example, when the frequency of the first driving period DP1 is 240 Hz, the first frame FRa may be driven at 240 Hz. In other words, each of the length of the first driving period DP1 and the first frame FRa may be about 4.17 microseconds (ms).

In an embodiment, as illustrated in FIG. 7B, a second frame FRb may include a first driving period DP1 and a second driving period DP2. For example, the first driving period DP1 and the second driving period DP2 may be alternately repeated. In this case, the second frame FRb may be driven at 120 Hz. In other words, each of the length of the first driving period DP1 and the second driving period DP2 may be about 4.17 ms, and the length of the second frame FRb may be about 8.33 ms.

In an embodiment, as illustrated in FIG. 7C, a third frame FRc may include one first driving period DP1 and a plurality of repeated second driving periods DP2. For example, when the third frame FRc is driven at 1 Hz, the length of the third frame FRc is about 1 second, and the second driving period DP2 within the third frame FRc is repeated about 239 times.

As such, by controlling the number of repetitions of the second driving period DP2 within one frame, the display device 1000 may be freely driven at various frame frequencies (for example, 1 Hz to 480 Hz).

Figure 8:
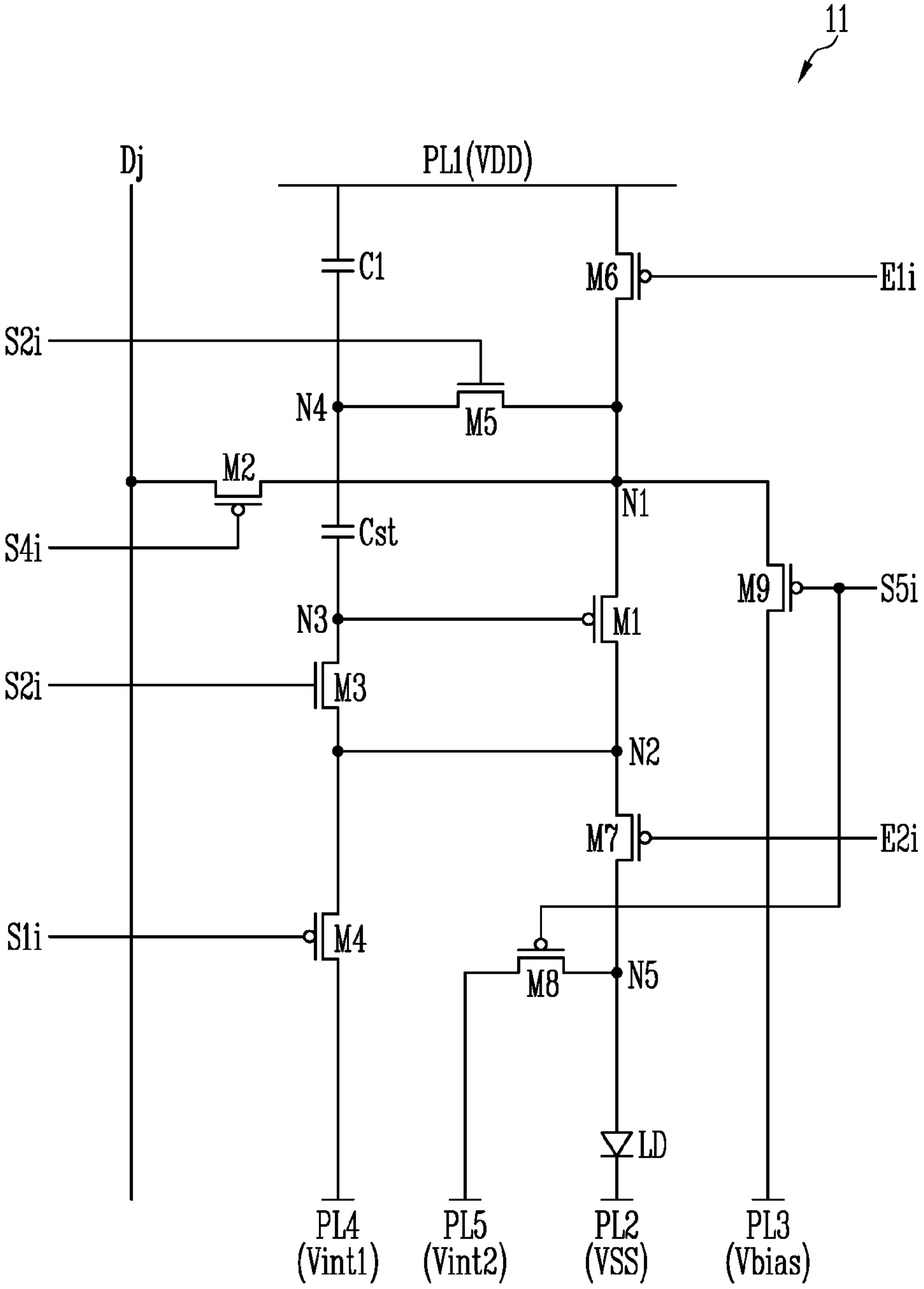
FIG. 8 is a circuit diagram illustrating another example of a pixel included in the display device of FIG. 1.
Figure 9:
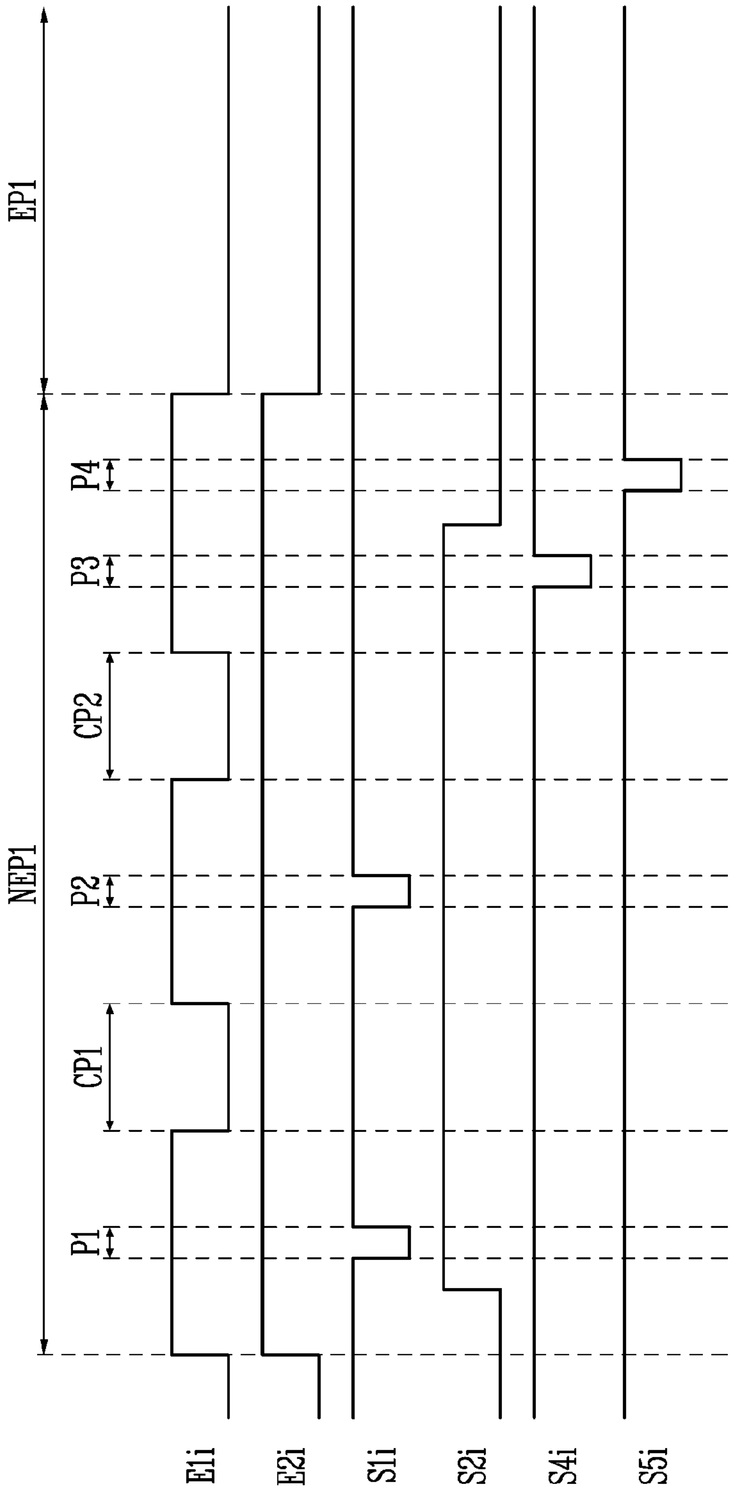
FIG. 9 is a timing diagram illustrating an example of signals supplied to the pixel of FIG. 8 in a first driving period.

FIG. 8 is a circuit diagram illustrating another example of a pixel included in the display device of FIG. 1, and FIG. 9 is a timing diagram illustrating an example of signals supplied to the pixel of FIG. 8 in a first driving period.

Since a pixel 11 of FIG. 8 has the same configuration and operation as the pixel 10 described with reference to FIG. 4, except for a fifth transistor M5 and a second scan signal, the same reference numerals are used to refer to the same or corresponding components and redundant descriptions thereof are omitted.

Referring to FIGS. 1, 8, and 9, the pixel 11 may include a light emitting element LD, first to ninth transistors M1 to M9, a storage capacitor Cst, and a first capacitor C1.

In an embodiment, a gate electrode of the third transistor M3 and a gate electrode of the fifth transistor M5 may be commonly connected to a second scan line S2*i*. Therefore, the third transistor M3 and the fifth transistor M5 may be controlled in common.

In an embodiment, the supply of the second scan signal to the second scan line S2*i* may be started before the first period P1, and may be stopped before the fourth period P4. Therefore, the third transistor M3 and the fifth transistor M5 may be in a turned-on state in the first period P1, the first compensation period CP1, the second period P2, the second compensation period CP2, and the third period P3.

For example, unlike the embodiment of FIG. 5, even when the fifth transistor M5 is turned on in the first period P1, the sixth transistor M6 is in a turned-off state, and thus the initialization of the voltage of the third node N3 is not affected. In addition, unlike the embodiment of FIG. 5, even when the third transistor M3 is turned on in the third period P3, the fourth and seventh transistors M4 and M7 are in a turned-off state, and thus data writing is not affected.

Therefore, the structure of the pixel 11 and the display device 1000 driving the same may be simplified, and manufacturing costs may be reduced compared to the pixel 10.

Figure 10:
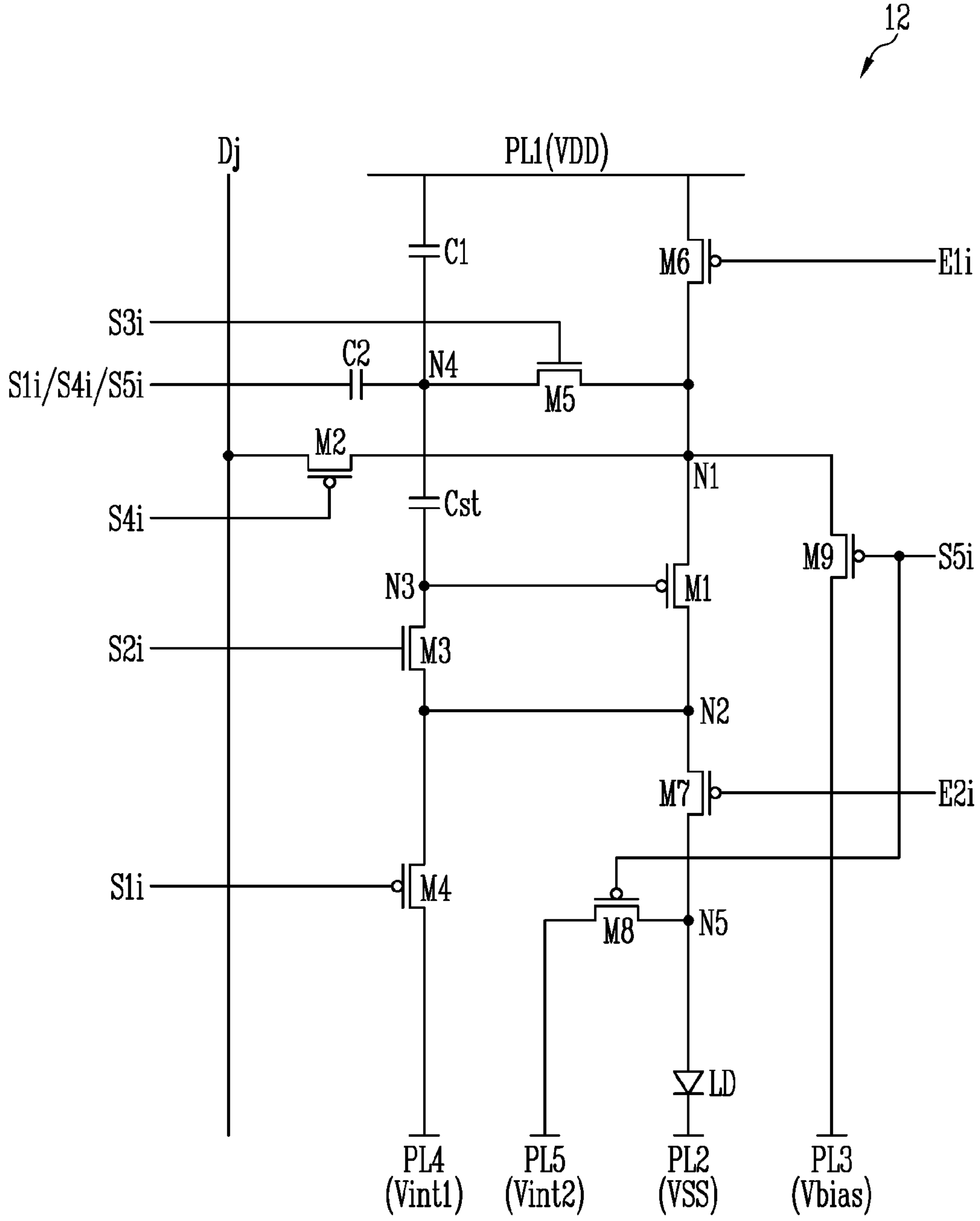
FIG. 10 is a circuit diagram illustrating still another example of a pixel included in the display device of FIG. 1.

FIG. 10 is a circuit diagram illustrating still another example of a pixel included in the display device of FIG. 1.

Since a pixel 12 of FIG. 10 has the same configuration and operation as the pixel 10 described with reference to FIG. 4, except for a second capacitor C2, the same reference numerals are used to refer to the same or corresponding components and redundant descriptions thereof are omitted.

Referring to FIGS. 1 and 10, the pixel 12 may include a light emitting element LD, first to ninth transistors M1 to M9, a storage capacitor Cst, a first capacitor C1, and a second capacitor C2.

In an embodiment, the second capacitor C2 may be connected between the fourth node N4 and one of the first scan line S1*i*, the fourth scan line S4*i*, and the fifth scan line S5*i*. The second capacitor C2 may function as a boosting capacitor.

For example, the third and fifth scan signals controlling the third and fifth transistors M3 and M5 that are n-type transistors have a high level. Therefore, when the third transistor M3 and/or the fifth transistor M5 is turned off, the third scan signal and/or the fifth scan signal transition from a high level to a low level, and the voltage level of the third node N3 may drop due to coupling by a parasitic component such as a parasitic capacitance between the corresponding scan lines (i.e., the one of the first scan line S1*i*, the fourth scan line S4*i*, and the fifth scan line S5*i*) and the third node N3 and/or the fourth node N4.

The second capacitor C2 may be used to compensate for an unintended voltage drop at the third node N3. For example, one end of the second capacitor C2 may be connected to one of the scan lines controlling the p-type transistor. For example, when one end of the second capacitor C2 is connected to the fourth scan line S4*i*, the voltage of the fourth node N4 may be increased by stopping the supply of the fourth scan signal to the fourth scan line S4*i* (that is, the fourth scan signal transitions from a low level to a high level). In addition, as the voltage of the fourth node N4 increases, the voltage of the third node N3 may increase. Therefore, the voltage drop at the third node N3 according to the control of the n-type transistor (e.g., the third transistor M3) may be compensated for.

A timing at which the voltage of the third node N3 is increased due to boosting by the coupling of the second capacitor C2 may be any timing during the first non-emission period (for example, NEP1 in FIG. 5).

As described above, by adding the second capacitor C2 to the pixel 12, the voltage drop at the third node N3 according to the control of the n-type transistor may be compensated for, and image quality may be effectively improved.

Figure 11:
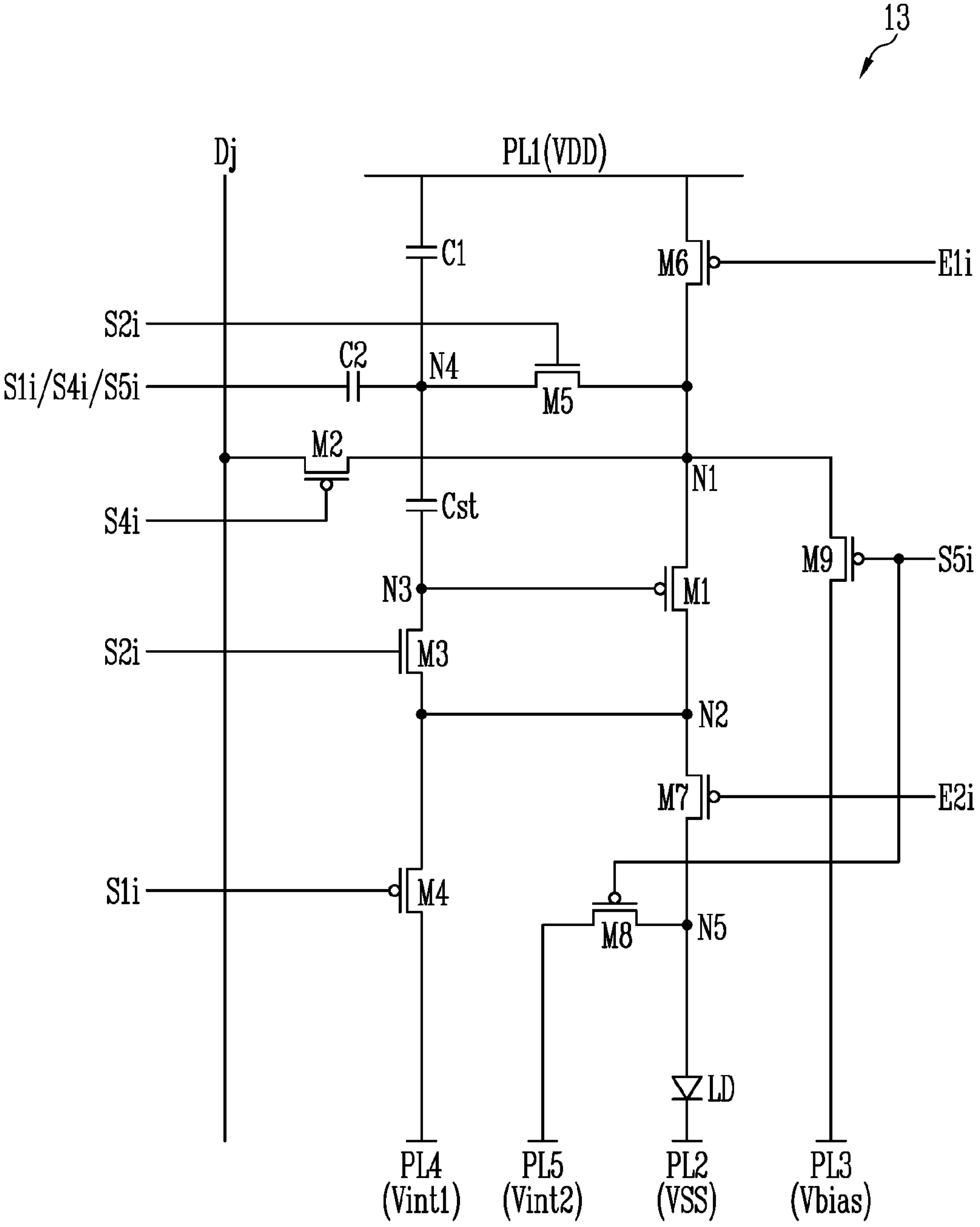
FIG. 11 is a circuit diagram illustrating yet another example of a pixel included in the display device of FIG. 1.

FIG. 11 is a circuit diagram illustrating yet another example of a pixel included in the display device of FIG. 1.

Since a pixel 13 of FIG. 11 has the same configuration and operation as the pixel 12 described with reference to FIG. 10, except for a fifth transistor M5 and a second scan signal, the same reference numerals are used to refer to the same or corresponding components and redundant descriptions thereof are omitted.

Referring to FIGS. 1 and 11, the pixel 13 may include a light emitting element LD, first to ninth transistors M1 to M9, a storage capacitor Cst, a first capacitor C1, and a second capacitor C2.

In an embodiment, a gate electrode of the third transistor M3 and a gate electrode of the fifth transistor M5 may be commonly connected to a second scan line S2*i*. Therefore, the third transistor M3 and the fifth transistor M5 may be controlled in common.

Therefore, the structure of the pixel 13 and the display device 1000 driving the same may be simplified, and manufacturing costs may be reduced.

Figure 12:
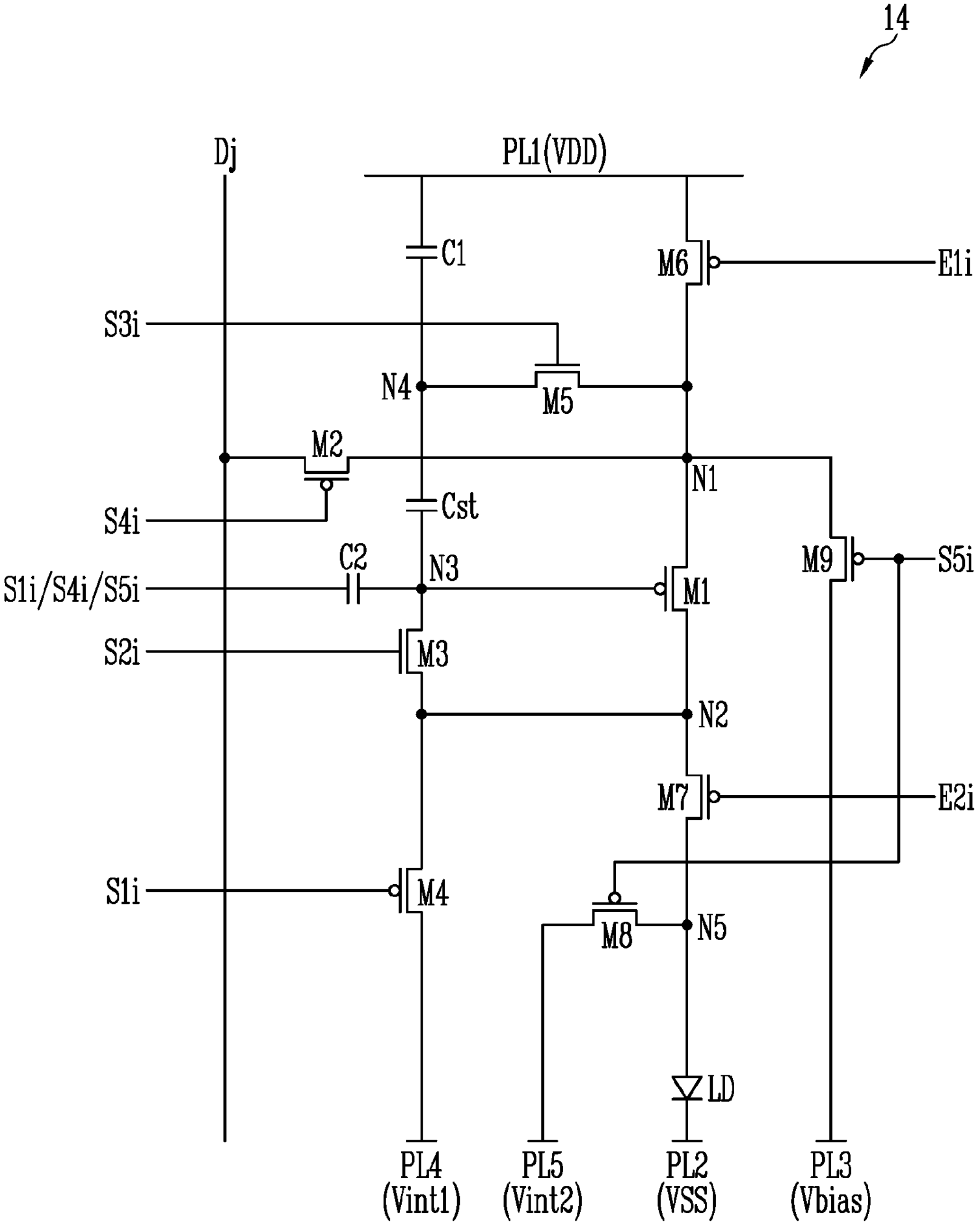
FIG. 12 is a circuit diagram illustrating another example of a pixel included in the display device of FIG. 1.

FIG. 12 is a circuit diagram illustrating another example of a pixel included in the display device of FIG. 1.

Since a pixel 14 of FIG. 12 has the same configuration and operation as the pixel 12 described with reference to FIG. 10, except for a second capacitor C2, the same reference numerals are used to refer to the same or corresponding components and redundant descriptions thereof are omitted.

Referring to FIGS. 1 and 12, the pixel 14 may include a light emitting element LD, first to ninth transistors M1 to M9, a storage capacitor Cst, a first capacitor C1, and a second capacitor C2.

In an embodiment, the second capacitor C2 may be connected between the third node N3 and one of the first scan line S1*i*, the fourth scan line S4*i*, and the fifth scan line S5*i*. The second capacitor C2 may function as a boosting capacitor.

For example, when one end of the second capacitor C2 is connected to the fourth scan line S4*i*, the voltage of the third node N3 may be increased by stopping the supply of the fourth scan signal to the fourth scan line S4*i* (that is, the fourth scan signal transitions from a low level to a high level). Therefore, the voltage drop at the third node N3 according to the control of the n-type transistor (e.g., the third transistor M3) may be compensated for.

As described above, since the pixel and the display device including the same according to the embodiments of the present invention include the n-type oxide semiconductor transistors, it is possible to prevent image quality deterioration due to current leakage in the pixel during low-frequency driving. In addition, it is possible to extend and secure the threshold voltage compensation time while removing the influence of the previous data voltage (the voltage of the data signal of the previous frame) through the control of the first emission control signal. Therefore, the image quality of high-speed driving at a frame frequency of 120 Hz or more may also be improved.

Furthermore, since the pixel is driven using the first and second driving periods, image quality for various frame frequencies may be effectively improved.

However, the effects of the present invention are not limited to the above-described effects, and may be variously expanded without departing from the spirit and scope of the present invention.

Although the present invention has been described with reference to the embodiments, it will be understood by those skilled in the art that various modifications and changes can be made thereto without departing from the spirit and scope of the present invention as set forth in the appended claims.

What is claimed is:

1. A display device comprising: a pixel connected to first to fifth scan lines, first and second emission control lines, and a data line; a scan driver which supplies first to fifth scan signals to the first to fifth scan lines, respectively; an emission driver which supplies first and second emission control signals to the first and second emission control lines, respectively; and a data driver which supplies a data signal to the data line, wherein the pixel comprises: a light emitting element; a first transistor connected between a first node and a second node and which generates a driving current flowing from a first power supply line, through which a first power supply voltage is supplied, to a second power supply line, through which a second power supply voltage is supplied, and flowing through the light emitting element; a second transistor connected between the data line and the first node and which is turned on in response to the fourth scan signal; a third transistor connected between the second node and a third node and which is turned on in response to the second scan signal, the third node being connected to a gate electrode of the first transistor; a fourth transistor connected between the second node and a third power line through which a third power supply voltage is supplied, and which is turned on in response to the first scan signal; a fifth transistor connected between the first node and a fourth node and which is turned on in response to the third scan signal; a sixth transistor connected between the first power supply line and the first node and which is turned off in response to the first emission control signal supplied to the first emission control line; a storage capacitor connected between the third node and the fourth node; and a first capacitor connected between the first power supply line and the fourth node, wherein gate-on levels of the second scan signal and the third scan signal are different from a gate-on level of the fourth scan signal.

2. The display device of claim 1, wherein a pulse width of the third scan signal is substantially equal to a pulse width of the second scan signal and is greater than each of pulse widths of the first scan signal and the fourth scan signal.

3. The display device of claim 1, wherein the pixel further comprises:

a seventh transistor connected between the second node and a first electrode of the light emitting element and which is turned off in response to the second emission control signal supplied to the second emission control line.

4. The display device of claim 3, wherein the emission driver stops the supply of the first emission control signal in each of a plurality of compensation periods of a first non-emission period of one frame, and supplies the second emission control signal without interruption during the first non-emission period.

5. The display device of claim 4, wherein the emission driver supplies the first emission control signal and the second emission control signal without interruption during a second non-emission period of the one frame.

6. The display device of claim 4, wherein the scan driver supplies the first scan signal to the first scan line a plurality of times in the first non-emission period, and periods in which the first scan signal is supplied and the compensation periods are alternately repeated in the first non-emission period.

7. The display device of claim 6, wherein the scan driver supplies the second scan signal and the third scan signal in the compensation periods.

8. The display device of claim 1, wherein the pixel further comprises: an eighth transistor connected between a first electrode of the light emitting element and a fourth power line through which a fourth power supply voltage is supplied, and which is turned on in response to the fifth scan signal.

9. The display device of claim 1, wherein the pixel further comprises:

a ninth transistor connected between the first node and a fifth power line through which a fifth power supply voltage is supplied, and which is turned on in response to the fifth scan signal.

10. The display device of claim 1, wherein the pixel further comprises:

a second capacitor connected between the fourth node and one of the first scan line, the fourth scan line, and the fifth scan line.

* * * * *